June 5, 1951     W. MILLER ET AL     2,556,040

DAMPING MEANS FOR CAPACITY TYPE PHONOGRAPH PICKUPS

Filed June 11, 1946

INVENTOR.
WALTER MILLER
FRANK SMARDO
BY Fred C. Geiger
ATTORNEY

Patented June 5, 1951

2,556,040

UNITED STATES PATENT OFFICE 2,556,040

DAMPING MEANS FOR CAPACITY TYPE PHONOGRAPH PICKUPS

Walter Miller and Frank Smardo, Benton Harbor, Mich.

Application June 11, 1946, Serial No. 675,986

2 Claims. (Cl. 179—100.41)

This invention relates to improvements in capacity or other type phono pick-ups. In phono pick-ups, the vibrations transmitted to the needle from a groove track on a record, are delivered to one of a pair of members relatively movable to each other as e. g. as the circuit, the current in which is accordingly varied in response to the variations in the capacity of the condenser as the distance between the plates is varied during the vibrations. In order to get good reproduction of the sound track, it is necessary to reduce inherent vibrations due to the resonance and the natural frequencies of the several parts of the device to a minimum. Various damping means have been used in prior pick-ups to eliminate distortions due to such vibrations with more or less success.

The object of the present invention is to construct a pick-up mechanism in which stray vibrations are kept at a minimum so as to improve the fidelity of reproduction.

A further object of the present invention is to improve the construction of a capacity or other pick-up mechanism by providing it with a novel damping means which will perform the function of improving the fidelity of reproduction by eliminating stray vibrations without decreasing the sensitivity of the mechanism.

A further object of the present invention is to provide a capacity or other type pick-up mechanism with magnetic damping means.

A further object of the present invention is to make a capacity or other pick-up in which the movable condenser plate or member is magnetically biased in one direction against a resilient bumper for purposes of damping out stray oscillations.

A still further object of the present invention is to provide a pick-up as above with means for adjusting the magnetic damping means as well as the condenser plate spacing.

Other and more specific objects will appear as the description of an illustrative form of the present invention proceeds, having reference to the accompanying drawings, wherein.

Figure 1:
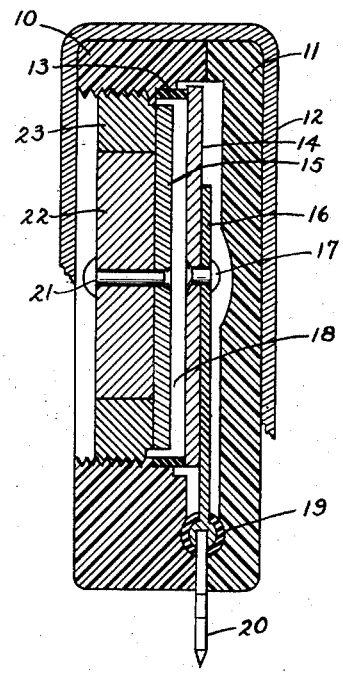
Figure 1 is a sectional view of one form of the device.
Figure 2:
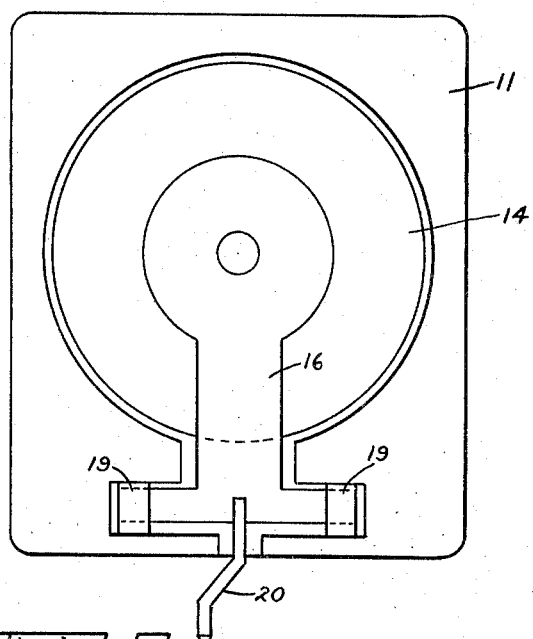
Figure 2 is a side view thereof with the outer shield and plastic cover removed.

As shown in the illustrated embodiment, the needle 20 is fixed in an actuating member 16 of magnetic material, which is pivotally mounted in rubber bearings 19 held in place in grooves between a plastic frame member 10 and a plastic cover 11, which may be held together by any suitable means. An outer non-magnet shield 12 may be formed over the frame and cover.

The frame member 10 has a large bore threaded in its outer portion, in which a correspondingly threaded collar 23 is adjustably mounted. The collar holds a permanent magnet 22 to which the stationary plate 15 of the condenser is fixed, as by a rivet 21. The inner end of this bore in the frame member is counterbored to receive a soft rubber bumper ring 13 against which the other plate 14 of the condenser, which is riveted by a rivet 17 to the actuating member 16, is biased by the magnetic attraction of the actuating member by the permanent magnet. The condenser plates 14 and 15 are of non-magnetic metal.

The condenser is placed in a conventional electric circuit in which the current oscillates in response to and in accordance with the vibrations of plate 14, as a result of the varying capacity incident to the space variations between the plates. This oscillating current may be magnified by well known amplifying means to operate a speaker, thus reproducing the sound track following by needle 20 with perfect fidelity, when the collar 23 is properly adjusted to obtain the best damping effect and to obtain the most effective spacing between the condenser plates.

Obviously, for production purposes where standardized parts are made in quantity, when a proper adjustment of the collar is determined for best performance the threaded parts may be finished off with a shoulder stop so that in assembly, it is merely necessary to screw the collar up against the shoulder to get the proper adjustment, as shown in Figure 1.

Thus a phono pick-up of high fidelity and simple construction may be made.

Many obvious modifications in form and dimensions of parts of this device to suit requirements may be made without departing from the spirit and scope of this invention, as defined in the appended claims.

What we claim is:

1. A capacity type pick-up head comprising in combination; first and second non-magnetic condenser plate members; a magnetic member rigidly attached to said first condenser plate; a stylus rigidly attached to said magnetic member; an insulating frame; means hingedly supporting said magnetic member at one end on said frame; means rigidly supporting said second condenser plate within said frame in substantially parallel adjustable spaced relation to said first condenser plate; a permanent magnet rigidly attached to and supported by said second condenser plate whereby said plates are normally biased toward each other by the action of said permanent magnet on said magnetic member; and resilient means interposed between said frame and said first condenser plate to bias said first plate away from said second plate.

2. A capacity type pick-up head as defined by claim 1 in which said condenser plates are of unequal size and said resilient biasing means is inserted wholly outside the periphery of the smaller plate so as to bias the larger plate away from the smaller without affecting the dielectric properties of the condenser.

WALTER MILLER.
FRANK SMARDO.

REFERENCES CITED

The following references are of record in the file of this patent:

UNITED STATES PATENTS

| Number | Name | Date |
|---|---|---|
| 1,302,140 | Crapo | Apr. 29, 1919 |
| 1,383,737 | McQuarrie | July 5, 1921 |
| 1,535,538 | Maxfield | Apr. 28, 1925 |
| 1,732,393 | Andrews | Oct. 22, 1929 |
| 1,747,829 | Harrison | Feb. 18, 1930 |
| 2,069,254 | Kunze | Feb. 2, 1937 |

FOREIGN PATENTS

| Number | Country | Date |
|---|---|---|
| 524,151 | France | May 9, 1921 |